Nov. 15, 1932. J. HANSFORD 1,888,123
PROCESS FOR THE MANUFACTURE OF GAS
Filed Dec. 5, 1927 2 Sheets-Sheet 2
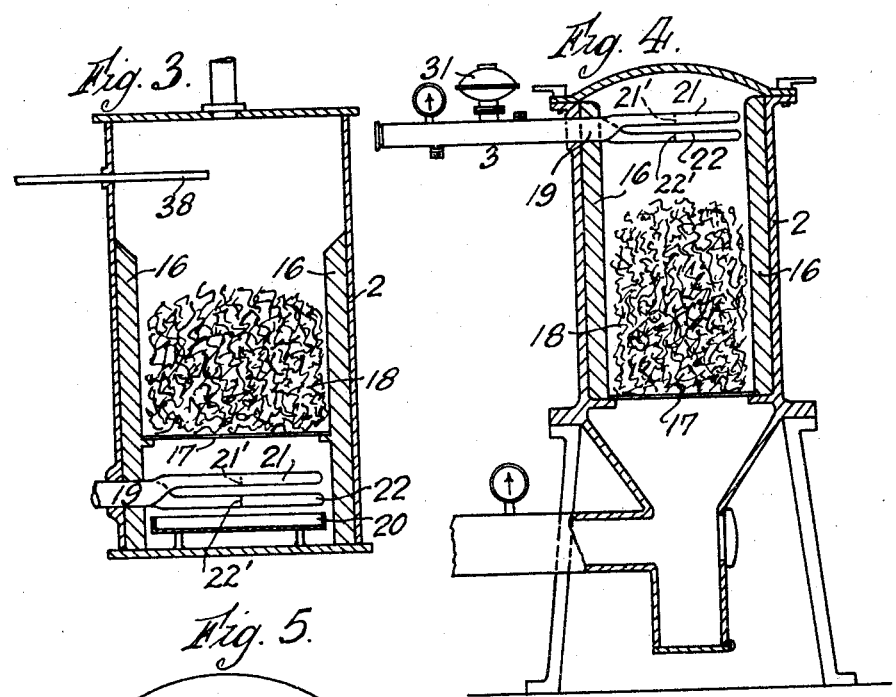
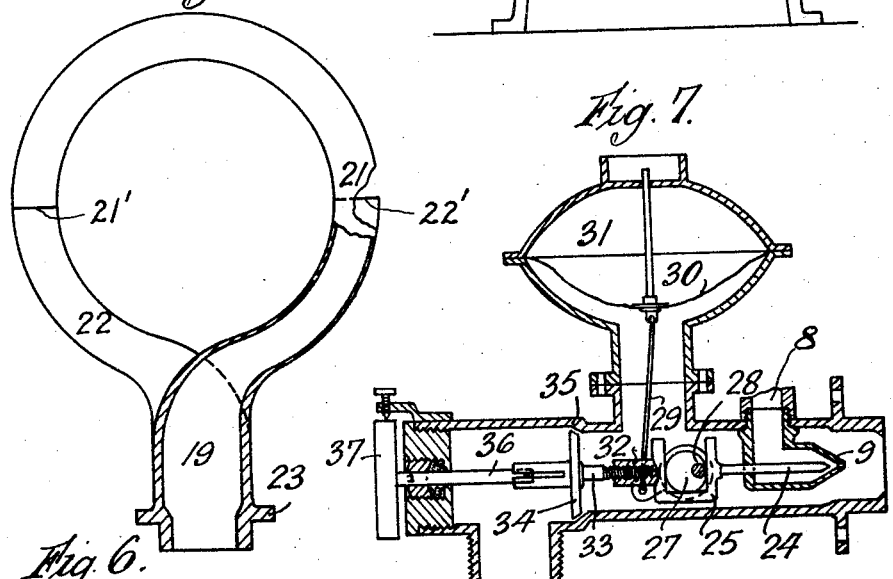
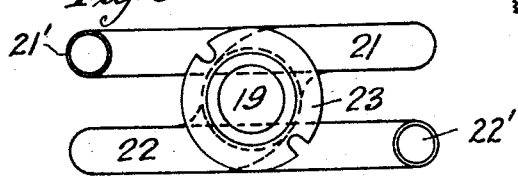

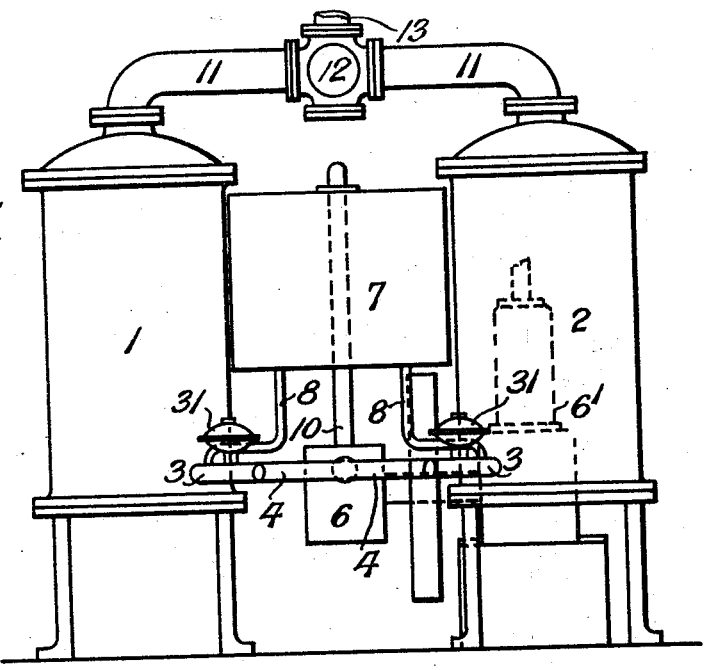

Patented Nov. 15, 1932

1,888,123

UNITED STATES PATENT OFFICE

JOHN HANSFORD, OF ENFIELD, ENGLAND, ASSIGNOR TO THE H. H. GAS PLANT SYNDICATE, LIMITED, OF LONDON, ENGLAND

PROCESS FOR THE MANUFACTURE OF GAS

Application filed December 5, 1927, Serial No. 237,932, and in Great Britain December 13, 1926.

This invention relates to a process for the manufacture of gas.

According to one feature of this invention liquid or powdered fuel is together with air injected into a combustion chamber and subjected to partial combustion in contact with a metalliferous body in a divided state.

The products of the partial combustion which are substantially gaseous are collected and may be caused to undergo complete combustion in the ordinary manner as a lighting or heating gas.

It has been found that steel shavings or other iron scrap are particularly suitable and that these are consumed during the process; satisfactory results have also been obtained when using other metals containing iron.

After a complete run, and when iron shavings have been used, it will be found that the metallic iron has substantially disappeared and any residue will consist of magnetic iron oxide, there being no other trace nor deposit of metallic iron in the partial combustion or gasifying chamber or in other parts of the apparatus. The residue of oxide left varies in accordance with the length of the run and in most cases when the run is complete no residue is apparent.

In order to increase the calorific value of the gas it may be enriched with oil gas: and preferably this is effected by dripping oil on to the metal shavings.

Fuels which have been found suitable include animal, vegetable and mineral oils, coal and also the nonvolatile or heavy hydrocarbon residues, such as asphalt.

According to another feature of the invention the flow of the carburetted mixture of air and liquid or other fuel to the combustion chamber is automatically controlled so that the amount fed to the chamber varies in accordance with the pressure therein.

According to a further feature of the invention the carburetted mixture is burnt in a flame of a rotary nature whose centre of rotation is substantially coincident with the hottest part of the combustion zone.

Preferably the flame produced is of a conical nature, and the burner may consist of two semicircular nozzles forming the upper arms of a Y so that the flame from the ends of each arm of the Y encircle the confining walls of the combustion chamber producing a conical combustion zone.

Apparatus for carrying out the process may comprise a vertical combustion chamber and a Y-shaped burner as described above in the lower portion thereof and located above a tray. The partial combustion chamber may be a steel or iron vessel, the lower half of which is lined with heat resisting material comprising the heating zone and in which the metalliferous shavings are positioned. Above this zone a second tray may be provided on which are arranged further shavings for receiving an enriching supply of oil for increasing the calorific value of the gas.

In a modification the burner may be located in the upper portion of the partial combustion chamber above the metalliferous shavings.

The invention is illustrated in the accompanying drawings in which Figs. 1 and 2 are respectively an elevational and plan view of a gas generating plant with a partial combustion chamber suitable for carrying out the process of the invention.

Fig. 3 is a vertical sectional view of one of the partial combustion chambers.

Fig. 4 shows a vertical sectional view of a modified form of partial combustion chamber.

Fig. 5 is a plan view, partly broken away, of the burner.

Fig. 6 is an end view of the burner.

Fig. 7 is an enlarged vertical section view of the liquid fuel jet and equalizing device.

Referring to Figs. 1 and 2, 1 and 2 are duplicate partial combustion chambers, 3 indicates pipes containing the jet regulating devices shown in detail in Fig. 7, and to which air under pressure is fed through the forks 4 of a pipe 5 from a blower 6. 6' and 6" indicate respectively a suitable form of motor and cooling tank.

In Fig. 1, a tank 7 is shown for containing the liquid fuel from which lead pipes 8 to jets 9 (see Fig. 7). 10 is a pressure pipe from the blower 6 to the oil tank 7. At the top of the partial combustion chambers are outlet pipes 11 which pass to a three-way valve 12 and thence are taken off through a pipe 13.

In Fig. 2, a scrubber tank 14 is shown into which the pipe 13 passes but this is not an essential and is not shown in Fig. 1. 15 are water seals also not shown in Fig. 1.

Referring now to Fig. 3, the partial combustion chambers consist of steel or iron cylinders, the lower halves of which are lined with heat resisting material 16 formed with a support for an iron or other metal grid 17 on which are positioned metalliferous shavings 18. Beneath the grid is a burner 19 located above a tray 20.

The burner 19 consists of two arcuate nozzles 21 and 22 (see Figs. 5 and 6) forming the upper arms of a Y. The same extending in opposite directions and being located in planes one above the other, the discharge ends thereof being designated 21' and 22', respectively, terminating at points situated diametrically opposite to one another.

The stem of the Y is provided with a flange 23 for attachment to the pipe 3 in which is located the jet 9 adapted for attachment to the fuel pipe 8 (see Fig. 1). The pipe 3 is adapted at its other end for attachment to one of the forks 4 for the supply of air under pressure.

To regulate the supply of combustible mixture a needle valve 24 is provided with a stirrup piece 25 embracing an eccentric 27 mounted on a bearing 28, and which is connected by a link 29 to a membrane 30 in a chamber 31.

On the rear side of the stirrup piece 25 is a projection 32 having a screwed bore to receive a shaft 33 on which is a mushroom valve 34 co-operating with a valve seat 35 in the wall of the pipe 3 and past which the air flows. The shaft 33 is slotted to receive a T piece 36 on the outer end of which is an adjusting knob for setting the valve 34.

It will be seen that any sudden rise of pressure in the partial combustion or gasifying chamber will cause a back pressure and displacement of the membrane 30, which will move the eccentric 27 to close the needle valve and at the same time close the mushroom valve 34 to shut off the air.

In Fig. 4, the position of the steel or other shavings is below that of the burner. This ensures better combustion and prevents any seepage of unburnt fuel past the burner, and which would collect in the bottom of the combustion chamber.

In certain cases it may be desirable to enrich the calorific quality of the gas and for this purpose a pipe 38 is provided in the top of the gasification chamber for the supply of oil.

In operation the blower is started, and liquid fuel is fed under pressure to the jet 9 for the gasification chamber 1 where it is vaporized by the air passing along the pipe 3, the vaporized mixture then passing into the burner nozzles 21 and 22 where it is ignited. The generator doors (not shown) are then closed.

The flame obtained is of a nature such as to produce a conical combustion zone.

It will be understood that should a sudden rise of pressure occur in the partial combustion or gasifying chamber it will cause a back pressure which is transmitted to the membrane 30, the latter moving upwardly to close the jet 9 through the action of the eccentric 27, and simultaneously to close the air valve 34.

The gas generated passes out from the top of the partial combustion chamber through the pipe 11, valve 12 and pipe 13 and thence to the washer 14, though this latter has been found unnecessary and the gas may be burnt without scrubbing.

It will be found that at the end of a run the iron shavings or other body containing metallic iron in a divided state will have, to a great extent, disappeared, leaving behind only a small quantity of magnetic iron oxide. While the chamber 1 is being recharged, the chamber 2 is started up.

The gas is richer and better than has hitherto been considered possible by known methods in dealing with the materials in question.

The following is an analysis of the gas obtained when using crude gas oil (specific gravity .833 to .890 at 60° F.

|  | Per cent by volume |
|---|---|
| Carbonic acid $CO_2$ | 6 |
| Unsaturated hydrocarbons | 3.8 |
| Oxygen $O_2$ | 0.2 |
| Carbonic oxide $CO$ | 13.2 |
| Hydrogen $H_2$ | 2.7 |
| Methane $CH_4$ | 5.2 |
| Nitrogen $N_2$ | 68.9 |
|  | 100 |

Calorific value 200 B. t. u. net, per cubic foot of gas.

130 cubic feet of this oil gas require 1 lb. of oil and $\frac{1}{10}$ lb. of a body containing metallic iron in a divided state.

The gas may be burnt in an ordinary incandescent burner, Bunsen burner or open flame.

Coal dust or other powdered solid fuel may be employed in place of a liquid fuel in which case the burner is modified by cutting short the burner nozzles and ash removing means would, of course, have to be provided. To increase the hydrogen content of the gas and thereby its calorific value steam may be blown into the partial combustion gasifying chamber below the nozzle or burner 19 through which, of course, the oil is admitted.

The process is worked at a high temperature which is necessary in view of the reaction and in order to obtain the decomposition of the body of metallic iron in a divided state. The temperature in the combustion chamber and of the gases generated is from 700° C.-900° C., but the temperature at the center of the combustion zone is considerably higher. The temperature maintained at the center of the combustion zone during the gas generation is in the neighborhood of 1600° C. to 2000° C.

What I claim is:—

1. A process for the manufacture of gas by injecting liquid or powdered fuel together with air into a partial combustion or gasifying chamber and subjecting it therein in the presence of a body containing metallic iron in a divided state to partial combustion through the action of a rotary flame at a temperature in said chamber of from substantially 700° C. to 900° C., the temperature at the center of the combustion zone being considerably higher and the proportions of air and oil being such that a residue of magnetic oxide is formed.

2. The process according to claim 1 wherein the center of the flame is substantially coincident with the hottest part of the combustion zone.

3. The process according to claim 1 wherein the said flame is located above said body.

In testimony that I claim the foregoing as my invention I have signed my name this 24th day of November, 1927.

JOHN HANSFORD.